Feb. 7, 1956  N. A. CONFALONE  2,733,512
PIPE GAUGE
Filed Feb. 2, 1953
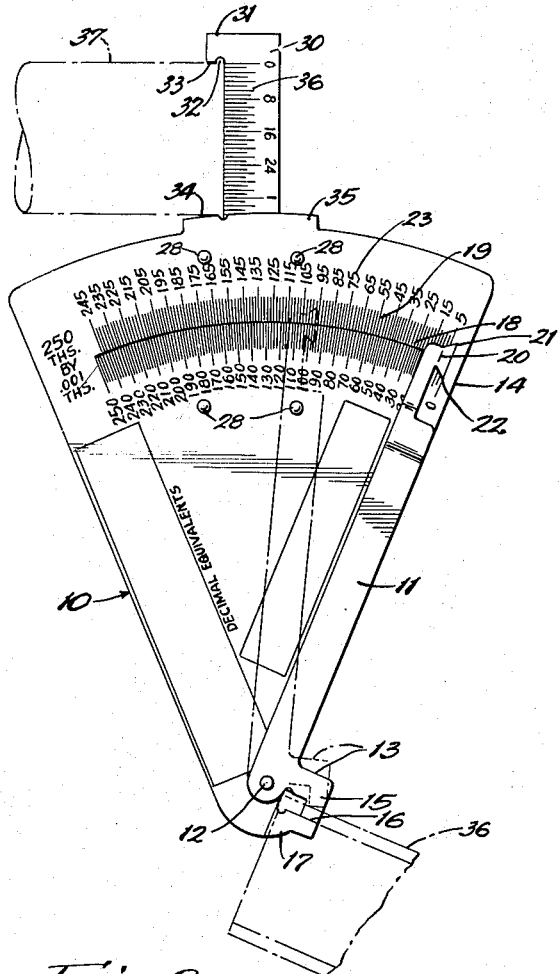
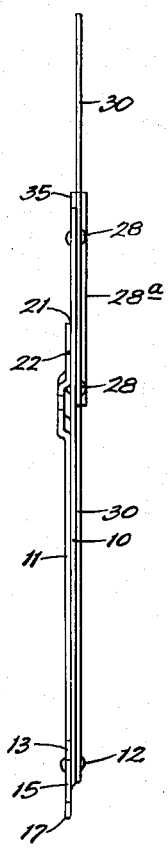
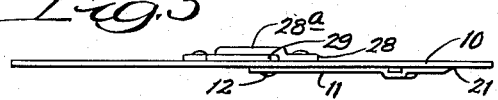
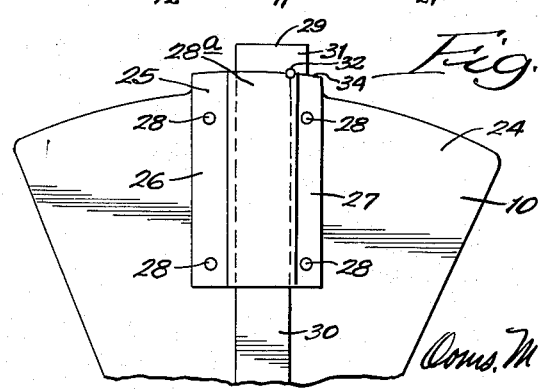
INVENTOR:
Nicholas A. Confalone,
BY
Ooms, McDougall, Williams & Hersh.
ATTORNEYS.

# United States Patent Office 2,733,512
Patented Feb. 7, 1956

2,733,512

PIPE GAUGE

Nicholas A. Confalone, Chicago, Ill., assignor to LNL Products Co., Evanston, Ill.

Application February 2, 1953, Serial No. 334,571

1 Claim. (Cl. 33—148)

This invention relates to a pipe gauge for use in the measurement of pipes and tubing to determine the outside diameter, the inside diameter and the wall thickness.

It is an object of this invention to produce a device of the type described which is simple in construction and easy in operation for use in the complete determination of the gauge of pipes including the outside and inside diameters and the thickness of the walls thereof.

These and other objects and advantages of this invention will hereinafter appear and for purposes of illustration, but not of limitation, an embodiment of the invention is shown in the accompanying drawing in which—

Figure 1 is a top plan view of a gauge embodying features of this invention;

Figure 2 is a side elevational view of the gauge shown in Figure 1;

Figure 3 is an end view of the gauge shown in Figure 1, and

Figure 4 is a fragmentary rear view of the gauge shown in Figure 1 with the stem for measuring the outside diameter shifted to zero position.

As shown in the drawing, a pipe gauge embodying features of this invention comprises a plate 10 formed of metal or other rigid material preferably formed to have the shape of a sector of a disc. An elongate lever arm 11 in the form of a pointer is pivoted at 12 at one end onto one face of the disc plate adjacent the end forming the axis of the sector for pendular movement of the arm 11 over the face of the plate. A flange or arm 13 integral with the pointer arm above the pivot 12 extends laterally beyond the side wall 14 of the plate and has a depending jaw portion 15 at the end thereof and spaced from the radial side wall or edge 14 of the plate which cooperates with a jaw portion 16 extending upwardly from a ledge or arm 17 integral with the disc plate below the pivot 12 and extending laterally in the same direction as the flange 13 but is bent upwardly to be offset from the plate by an amount to position the upstanding portion in alignment with the flange 13 to enable a contacting relation to be established between the ends 15 and 16 in use. The ledge 17 and the depending portion 15 may be tapered inwardly to a point spaced from the outer edges thereof but it is preferred that the contacting surfaces be formed relatively broad or flat to enable sufficient of the surface of the pipe to be engaged in position of use to avoid the possibility of error by reason of the fact that the members might become seated within the threads formed on the outer wall of the pipe. The arm 17 may be made relatively narrow for insertion into small diameter tubing.

An arc formed with the pivot 12 as its center is provided in the outer end portion of the plate as indicated by the line 18 and the arc is subdivided by indications 19 and provided with numerals 19a ranging from zero on up. A contacting relation is adapted to be established between members 15 and 16 while the pointer is disposed in the region adjacent one wall of the sector which constitutes the zero position and the pointer is adapted to shift counter-clockwise toward the other side of the disc plate as the space between the caliper members 15 and 16 increases. The end portion of the pointer arm 11 is reduced in width for a substantial portion thereof and is provided with an extension 20 at the end shaped in a manner to form pointers 21 and 22 extending in opposite directions but in parallel relation with the plate. The calibrations and the accompanying numerals 23 are spaced along the arc to provide a direct reading from the position of the pointers 21 or 22 when the calipers are a calculated distance apart. Such calibrations may be in thousandths of an inch as shown, or in any other fraction or they may be readable directly as pipe gauge thicknesses.

Mounted on the rear wall 24 of the plate, intermediate the side walls and adjacent the periphery thereof, is a guide plate 25 in the form of a metal member having laterally spaced side walls 26 and 27 secured, as by rivets 28, to the rear wall of the plate and having an offset or embossed central portion 28a which, when the plate 25 is assembled onto the rear of the triangular member 24, provides an elongate slot 29. Slidable endwise through the slot 29 is an elongate blade 30 formed of metal, plastics or the like rigid material having an extension 31 integral with the upper edge portion thereof which projects laterally above the slot and is formed with a cutout portion 32 to provide a stop 33 spaced from the blade 30 and in position to engage the upper edge 34 of the plate or of the triangular member to which it is attached, each of which are adapted to extend together a short distance beyond the periphery of the triangular plate as indicated by the numeral 35. The blade is subdivided throughout its length by indications 36 to provide a measurement of the distance between the stop 33 and the upper edge 34 of the plate with the zero reading corresponding to the position of the blade when the stops are in contacting relation. For best use, it is preferred that the stop member 33 and the upper edge portion of the plate 34 in cooperation therewith be formed to have a relatively flat edge of substantial dimension so as to engage sufficient of the pipe or tubing positioned therebetween to span the threads and thereby accurately determine the outside diameter of the pipe.

In practice, the gauge may be used to determine wall thickness, outside diameter and by subtraction of wall thickness from outside diameter, immediately calculate the inside diameter of a pipe or tubing. For measurement of wall thickness, the pointer arm 11 is shifted in the counterclockwise direction to position the caliper members a sufficient distance apart to enable the end of a pipe indicated in broken lines by the numeral 36 to be inserted between the caliper members 15 and 16 into contacting relation with the side wall 14 of the triangular plate. The pipe is then brought to rest with the inner wall engaging the upper surface of the ledge 16 and then the pointer arm 11 is shifted in the clockwise direction until the depending portion 15 is stopped upon engagement of the outer wall of the pipe. This position is illustratively indicated by the broken line in Figure 1 and the thickness of the pipe wall can be read directly from the indications underlying the pointers 21 or 22.

Having determined the thickness of the walls, the outside diameter is then measured by first pulling the slide or blade 30 outwardly by an amount greater than the estimated diameter of the tubing or pipe. The gauge is then positioned onto the end of the pipe 37 as indicated by the broken line in Figure 1 with the underside of the pipe resting upon the shoulder 34 or the upper edge of the plates. The slide is then adjusted inwardly until the stop 33 comes to rest upon the outer wall in the upper portion of the pipe. The distance between the stop 33 and the shoulder 34 can then be read directly in inches or the like from the calibrations provided on the blade 30. By subtracting the wall thicknesses doubled from the determined outside diameter, the inside diameter of the tubing can be determined.

It will be apparent that special problems are involved in the measurement of wall thicknesses, tubes and the like, and their outside and inside diameters especially when tubing of many shapes and configurations on the walls may exist. To simplify the measurement and to increase the accuracy thereof, the caliper members are formed to engage portions of the pipe spaced from the ends and to engage a sufficient width of the pipes to eliminate the effect of figurations or threads but without inducing error by reason of the natural curvatures which might exist in the pipe or tubing.

It will be apparent from the description that new and novel concepts are provided with respect to the combination of elements in a single system for measuring wall thickness and outside diameter and for subsequent calculation of inside diameter of the pipe or tubing in a simple and expedient manner. It will also be apparent that provisions have been made to overcome the difficulties in the measurement of pipes and tubings by reason of differences which might exist because of threads or because of tapers in the ends of the pipes in which threads are formed.

It will be understood that changes may be made in the details of construction, arrangement and operation without departing from the spirit of the invention, especially as defined in the following claim.

I claim:

In a gauge, a rigid plate generally in the form of a sector of a circular disc, a flat L-shaped lever having a pivot connection to said sector plate adjacent the circular center thereof and having a pair of lever arms extending generally radially from said pivot connection and generally at right angles to each other, one of said lever arms constituting an elongate pointer swingable through an arc along the front face of said sector plate, the other of said lever arms constituting a first jaw arm extending laterally relative to said pointer beyond one radial edge of said sector plate, said pointer being several times longer than said jaw arm, said sector plate being formed with a second jaw arm projecting laterally therefrom generally at right angles to said radial edge thereof at a point on said plate on the opposite side of said pivot connection from the portion of said plate traversed by said pointer, said jaw arms having respective first and second interengageable jaws with said first jaw projecting from said first jaw arm toward said second jaw arm and generally at right angles to said first jaw arm, said jaws having interengageable faces generally at right angles thereto, said second jaw arm on said plate having a forwardly offset inner portion to bring said jaw thereon to the level of said jaw on said lever, said jaw arm on said plate being narrow relative to its length for insertion into small diameter tubing, said pointer extending adjacent said radial edge of said plate with said jaws engaged and being movable along said plate away from said edge to open said jaws, and calibrations in the face of said plate along the arc traversed by said pointer and having a zero marking adjacent said radial edge.

References Cited in the file of this patent

UNITED STATES PATENTS

| | | |
|---|---|---|
| 305,036 | Abbott | Sept. 16, 1884 |
| 724,963 | Spaulding | Apr. 7, 1903 |
| 864,145 | Anderson | Aug. 27, 1907 |
| 1,516,631 | D'Erville | Nov. 25, 1924 |
| 1,659,939 | Avery | Feb. 21, 1928 |
| 1,990,138 | Schuster | Feb. 5, 1935 |
| 2,358,987 | MacKay | Sept. 26, 1944 |
| 2,581,219 | Thorburn | Jan. 1, 1952 |
| 2,587,774 | Shack | Mar. 4, 1952 |
| 2,665,488 | Tobey | Jan. 12, 1954 |

OTHER REFERENCES

Publication: Popular Science, Aug. 1945, page 163.